US 8,972,784 B2

(12) United States Patent
Mangold et al.

(10) Patent No.: US 8,972,784 B2
(45) Date of Patent: Mar. 3, 2015

(54) METHOD AND DEVICE FOR TESTING A SYSTEM COMPRISING AT LEAST A PLURALITY OF SOFTWARE UNITS THAT CAN BE EXECUTED SIMULTANEOUSLY

(75) Inventors: Florian Mangold, Raubling (DE); Harald Rölle, Putzbrunn/Oedenstockach (DE)

(73) Assignee: Siemens Aktiengesellschaft, Munich (DE)

( * ) Notice: Subject to any disclaimer, the term of this patent is extended or adjusted under 35 U.S.C. 154(b) by 292 days.

(21) Appl. No.: 13/503,535

(22) PCT Filed: Aug. 20, 2010

(86) PCT No.: PCT/EP2010/062148
§ 371 (c)(1),
(2), (4) Date: Jul. 19, 2012

(87) PCT Pub. No.: WO2011/047901
PCT Pub. Date: Apr. 28, 2011

(65) Prior Publication Data
US 2012/0278660 A1    Nov. 1, 2012

(30) Foreign Application Priority Data
Oct. 21, 2009   (DE) .......................... 10 2009 050 161

(51) Int. Cl.
*G06F 11/36* (2006.01)
(52) U.S. Cl.
CPC .................................. *G06F 11/3688* (2013.01)
USPC .................................. 714/32; 714/25; 714/34

(58) Field of Classification Search
CPC ............ G06F 11/1608; G06F 11/1629; G06F 11/1633; G06F 11/1637; G06F 11/1641; G06F 11/1645
USPC ............ 714/11, 12, 34, 48, 49, 51, 54, 25, 32
See application file for complete search history.

(56) References Cited

U.S. PATENT DOCUMENTS

| | | | | | |
|---|---|---|---|---|---|
| 4,330,826 | A | * | 5/1982 | Whiteside et al. | 714/12 |
| 5,193,175 | A | * | 3/1993 | Cutts et al. | 714/11 |
| 5,491,787 | A | * | 2/1996 | Hashemi | 714/11 |
| 5,845,060 | A | * | 12/1998 | Vrba et al. | 714/12 |
| 6,002,871 | A | | 12/1999 | Duggan et al. | 395/704 |

(Continued)

FOREIGN PATENT DOCUMENTS

EP       2037368 A2       3/2009 ............. G06F 11/36

OTHER PUBLICATIONS

Ayewah, N., et al., "Using Static Analysis to Find Bugs", Focus Software Development Tools, IEEE Software, pp. 22-29, 2008.

(Continued)

*Primary Examiner* — Joseph Schell
(74) *Attorney, Agent, or Firm* — King & Spalding L.L.P.

(57) ABSTRACT

A programmable operating time period of at least one software unit is changed to a settable operating time period. Furthermore, a testing system for validating the system and for setting the at least one settable operating time period is provided. Furthermore, the system is tested using the testing system, wherein the testing includes varying the at least one settable operating time period for detecting synchronization errors of the system. Thus, a test of a system including software units for synchronization errors is enabled by the targeted change of operating time period.

14 Claims, 4 Drawing Sheets

(56) References Cited

U.S. PATENT DOCUMENTS

| | | | | |
|---|---|---|---|---|
| 6,718,484 | B1* | 4/2004 | Kodera | 714/35 |
| 7,971,095 | B2* | 6/2011 | Hess et al. | 714/15 |
| 8,036,874 | B2* | 10/2011 | Igarashi | 703/22 |
| 8,667,315 | B2* | 3/2014 | Agata | 713/375 |
| 2005/0177775 | A1 | 8/2005 | Qadeer et al. | 714/38 |
| 2009/0177866 | A1* | 7/2009 | Choate et al. | 712/200 |
| 2012/0204062 | A1* | 8/2012 | Erickson et al. | 714/35 |

OTHER PUBLICATIONS

Bacon, D., et al., "Guava: A Dialect of Java without Data Races", Object-Oriented Programming, Systems, Languages, and Applications; pp. 382-400, 2000.

Bergqvist, M., "Debugging Multicore Software using Virtual Hardware", Power Architecture Conference, Paris, www.power.org/events/powercon/paris/Virtutech-Multicore_Debug_PAC_EU_May-2008v6.pdf; 43 pages, May 25, 2010.

Boyapati, C., et al., "Ownership Types for Safe Programming: Preventing Data Races and Deadlocks", ACM Conference on Object-Oriented Programming, Systems, Languages, and Applications; pp. 211-230, Nov. 2002.

Choi, Jong-Deok, et al., "Efficient and Precise Datarace Detection for Multithreaded Object-Oriented Programs", Proceedings of the ACM SIGPLAN 2002 Conference on Programming Language Design and Implementation; pp. 258-269, Jun. 17, 2002.

Engler, D., et al., "RacerX: Effective, Static Detection of Race Conditions and Deadlocks", SIGOPS Oper. Syst. Rev. vol. 37, No. 5; pp. 237.252, Oct. 19, 2003.

Hohmuth, M., et al., "Pragmatic Nonblocking Synchronization for Real-Time Systems", Proceedings of the 2001 USENIX Annual Technical Conference, pp. 217-230, 2001.

Hovemeyer, D., et al., "Finding Concurrency Bugs in Java", Proceedings of the PODC Workshop on Concurrency and Synchronization, 10 pages, 2004.

Laarhoven, P.J.M., et al., "Simulated Annealing: Theory and Applications", Kluwer Academic Publishers, Mathematics and Its Applications; 10 pages, 1987.

Mangold, F., Performanzanalyse mit Hilfe Künstlicher Varianz, Diplomarbeit, Ludwig-Maximilians-Universität, Munich; with English abstract; 146 pages, May 2007.

Musuvathi, M., et al,. "Finding and Reproducing Heisenbugs in Concurrent Programs", OSDI, UNENIX Association, pp. 267.280, 2008.

Netzer, R., "What are Race Conditions? Some Issues and Formalizations", ACM Letters on Programming Languages and Systems, vol. 1, No. 1; pp. 74-88, Mar. 1, 1992.

Ontko, R., "MOSS Deadlock Simulator User Guide", www.ontko.com/moss/deadlock/user_guide.html, 8 pages, Aug. 18, 2001.

Stoller, S., "Testing Concurrent Java Programs using Randomized Scheduling", Proc. Second Workshop on Runtime Verification; Electronic Notes in Theoretical Computer Science; 16 pages, Jul. 2002.

Prete, C, et al., "The Charm Tool for Tuning Embedded Systems", IEEE Service Center, IEEE Micro; vol. 17, No. 4; pp. 67-76, Jul. 1, 1997.

Poursepanj, A., "The PowerPC Performance Modeling Methodology", Communications of the Association for Computing Machinery, vol. 37, No. 6, pp. 47-55, Jun. 1, 1994.

Yourdon, E., et al., "Structured Design, Fundamentals of a Discipline of Computer Program and Systems Design", Yourdon Press Computing Series; 14 pages, 1979.

Yu, Yuan, et al., "RaceTrack: Efficient Detection of Data Race Conditions via Adaptive Tracking", 14 pages, Oct. 23, 2005.

German Office Action, German Patent Application No. 10 2009 050 161.4-53, 7 pages, Dec. 10, 2010.

International PCT Search Report and Written Opinion, PCT/EP2010/062148, 16 pages, Nov. 18, 2010.

\* cited by examiner

METHOD AND DEVICE FOR TESTING A SYSTEM COMPRISING AT LEAST A PLURALITY OF SOFTWARE UNITS THAT CAN BE EXECUTED SIMULTANEOUSLY

CROSS-REFERENCE TO RELATED APPLICATIONS

This application is a U.S. National Stage Application of International Application No. PCT/EP2010/062148 filed Aug. 20, 2010, which designates the United States of America, and claims priority to DE Patent Application No. 10 2009 050 161.4 filed Oct. 21, 2009. The contents of which are hereby incorporated by reference in their entirety.

TECHNICAL FIELD

The disclosure relates to a method and a system for testing a system having at least a plurality of software units that can be executed simultaneously.

The technical field of the disclosure concerns the testing of asynchronously operating software units of a system in order to detect synchronization errors in the synchronization of the asynchronously operating software units.

BACKGROUND

In the context of the present disclosure, the expression "synchronization error" relates to a software error caused by faulty or insufficient synchronization of the software units of the system.

A particular case of a synchronization error is a "race condition". A race condition relates to the possibility that a software error can occur and does not necessarily appear at every execution of the system. Such a race condition can occur, for example, as a result of non-deterministic side-effects on execution of the system. Race conditions are therefore non-deterministic and undesirable effects and are therefore errors, which can occur due to parallelism in the system.

Cited Reference [10], page 75 defines race conditions in a more precise, expanded and formalized way. According to this, race conditions are errors which can occur in programs and have the effect that programs show non-deterministic behavior. Data races, by contrast, are errors in programs, where shared data is accessed in a critical region and become changed. The overarching concept of "races" is used in the present application to denote both race conditions and data races.

The use of asynchronously operating software units for processing parallel instruction blocks occurs for a plurality of reasons. An important reason is efficiency enhancement through improved capacity utilization in the system, for example, a computer system. Whereas the software system must wait for input from a user, other calculations, data access or the like can be carried out during this waiting time. In the case of sequential execution, this is not possible. Thus with parallel execution, the overall software system is ready for a new user interaction at an earlier stage. The system also operates more effectively because the throughput is increased. The aim here is enhancement of the performance of a single program.

A further reason for the use of parallel and asynchronously operating software units is the use of multitasking systems. Multitasking systems are used, inter alia, to improve user interaction. Such multitasking systems must also be correspondingly designed and implemented for multitasking from the software standpoint, that is for the parallel handling of linked instructions or threads. The aim in this respect is the enhancement of the performance of a system with the potential for a plurality of simultaneously executed programs.

Thus, for efficiency enhancement and, on the basis of new computer architectures, software systems may be designed and implemented with parallel handling in view. Server systems, for one example, are based to a large extent on parallelism of this kind. The resulting multiform parallel interactions in the software may be difficult for a person, particularly a tester, to oversee. The individual parallel processing lines may be synchronized in the correct manner again at some time for handling a task, and not later than the end of said handling. This may entail very great potential for errors.

To summarize, asynchronous operation of software units or software components is becoming ever more desirable. However, adequate validation methods are not available in conventional systems. According to an investigation of Java code by David Hovemeyer and William Hugh [7], synchronization errors are more the rule than the exception.

SUMMARY

In one embodiment, a method is provided for testing a system having a plurality of software units that can be executed simultaneously and are configured respectively for execution of a thread and for providing a common result and respectively having a programmable operating time period of the execution. The method includes (a) changing a pre-set operating time period of at least one software unit to a settable operating time period; (b) provision of a test means for validating the system and for setting the at least one settable operating time period; and (c) testing the system by means of the test means, wherein the testing includes varying the at least one settable operating time period for detecting synchronization errors of the system.

In a further embodiment, the programmed operating time properties of the execution of the respective software unit are configured by the programmed operating time period of the execution of the respective software unit, by means of a starting time point for the execution and by means of an end time point for the execution. In a further embodiment, the programmed operating time period of at least one software unit is changed to a settable operating time period and that the predetermined starting time point of at least one software unit is changed to a settable starting time point and/or that the predetermined end time point of at least one software unit is changed to a settable end time point. In a further embodiment, the testing of the system involves varying the at least one settable operating time period and varying the at least one settable starting time point and/or varying the at least one settable end time point. In a further embodiment, the changing of at least one of the operating time properties of the execution of the respective software unit to provide at least one settable operating time property is configured by changing a code of the respective software unit. In a further embodiment, the changing of at least one of the operating time properties of the execution of the respective software unit to provide at least one settable operating time property is configured by: providing a number of hardware units which are set up to process the software units; simulating the respective hardware unit to provide a respective simulated hardware unit; and extending the respective simulated hardware unit such that at least one of the operating time properties of the simulated hardware unit, by means of which the respective software means is processed at the execution time point of the software means, is adjustable. In a further embodiment, the simulation of the respective hardware unit is configured as a virtualization or an emulation.

In a further embodiment, the testing of the system is carried out to provide test result data, wherein a predeterminable number of synchronization measures which are predetermined and to be investigated, said measures being used for synchronization of the software units, is suppressed during testing and the testing is carried out to the end with the synchronization measures suppressed, wherein the test result data provided are validated to detect unnecessary synchronization measures. In a further embodiment, the synchronization measures investigated by the testing are identified, in the event of a positive validation of the test results provided, as being unnecessary synchronization measures. In a further embodiment, variation of the at least one settable operating time period is configured as prolongation of the operating time period by a predetermined duration. In a further embodiment, a plurality of predetermined operating time periods of a plurality of software units is changed to provide respectively settable operating time periods. In a further embodiment, the testing comprises varying the plurality of settable operating time periods of the plurality of software units.

In another embodiment, a computer program product is provided which initiates the execution of any of the methods discussed above on a program-controlled apparatus.

In another embodiment, a device is provided for testing a system having at least a plurality of software units that can be executed simultaneously and are configured for execution of a thread and for providing a common result and respectively having a programmable operating time period of the execution. The device includes (a) a changing means for changing a pre-set operating time period of at least one software unit to a settable operating time period; and (b) a test means for testing the system, the test means being configured to vary the at least one settable operating time period in order to detect synchronization errors of the system.

As used herein, the word "settable" means capable of being set.

BRIEF DESCRIPTION OF THE DRAWINGS

Example embodiments will be explained in more detail below with reference to figures, in which.

DETAILED DESCRIPTION

Figure 1:
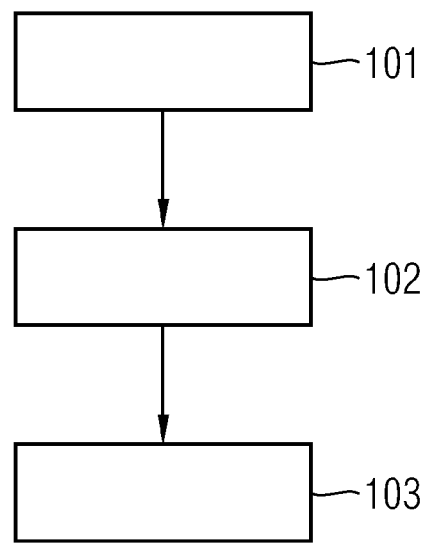
FIG. 1 shows a schematic flow diagram of a first example embodiment of a method for testing a system comprising a plurality of software units that can be executed simultaneously.

Some embodiments provide an improved possibility for detecting synchronization errors in a system with a plurality of asynchronously operating software units.

For example, some embodiments provide a method for testing a system having at least a plurality of software units that can be executed simultaneously and are configured respectively for execution of a thread and for providing a common result and respectively having a programmable operating time period of the execution. The method may include the following steps: changing the pre-set operating time period of at least one software unit to a settable operating time period; provision of a test means for validating the system and for setting the at least one settable operating time period; and testing the system by means of the test means, wherein the testing includes varying the at least one settable operating time period for detecting synchronization errors of the system.

In some embodiments, a system comprises a plurality of software units which can be executed simultaneously, which operate, in particular, asynchronously relative to one another. The respective software unit comprises at least one program and data.

The system can also comprise external factors such as hardware units, an operating system and optionally, other programs. The software units and the hardware units, in particular, can interact with one another and influence one another.

A program comprises modules. A module is a structurally coherent code. A program code is preferably subdivided into various modules [12].

The software units, the hardware units and the modules can interact with one another and influence one another. Among other things, asynchronous operations can be added thereto. In order to control the chronological execution of lines of operation or threads adjacent to one another, a scheduler or control program is preferably provided. Said scheduler must be non-deterministic and can also be interruptive (pre-emptive). Thus, a discrete code becomes a non-deterministic and chaotic and therefore barely controllable system which must be checked for correctness.

The checking for the correctness of the system by means of a software test is designated validation. According to certain embodiments, a conventional software test is combined with an empirical experiment regarding the variation of the operating time properties. By means of this combination, synchronization errors can be discovered.

Software testing is defined in IEEE Standard 610 as a process of the operating system of a system or a component under defined conditions, observing and recording the results, and making an evaluation of some aspect of the system or component.

Empirical experiments in software technology are described in [8]. In this connection, particular properties, in the present case at least the operating time period or optionally further operating time properties, are changed or varied in order, similarly to an experiment in scientific disciplines, to discover correlations from the observed system. Changing the operating time properties of software units is made possible by the simulation, for example the virtualization and/or emulation. Since a system can include the most varied of software units, the operating time properties of different software units can be varied and observed.

Variation comprises, in particular, setting the respective operating time property a plurality of times sequentially.

Testing according to certain embodiments involves individual software units of the system being specifically changed with regard to the operating time period thereof. Such changing can be prolongation, displacement (retardation) or shortening (simulated optimization). Furthermore, the start time point and/or the end time point of the execution of the software unit can be varied. Retardation or prolongation of the respective software unit is carried out by the test means according to certain embodiments. The system is preferably executed by a virtual machine. The test means tests the system, particularly by means of a test code, as to whether every assurance of synchronization can be maintained in every possible combination of operating time period and time point.

For example, the developer or tester who operates the test means according to certain embodiments can specify which software unit for testing is to be prolonged, slowed or retarded by what time period. This prolongation, slowing or retardation can also take place successively, for example, by 5, 15 or 20 ms. This prolongation, slowing or retardation can also be measured percentally over the totality of the execution. In this regard, it is advantageous to borrow from particular optimization methods, such as Simulated Annealing [13] or other heuristic methods.

Furthermore, a combination of software units is preferably changed, for example prolonged, with regard to the operating time period thereof. The prolongation takes over a test framework of the test means with the specially constructed virtual machine, in order thus to simplify the work of the developer or tester and to automate the test.

By way of example, the developer can specify, by means of the test means, a vector for each software unit which determines by what duration or by how many percent the totality of the execution of the respective software unit is to be prolonged or retarded. This results, in a special test case, in a vector of vectors which describes the behavior of the software units.

With the test means according to certain embodiments, which comprises, for example, an X-unit test framework, the results of the prolongation and retardation are tested. If the test succeeds for all the investigated intervals, the probability of a synchronization error is very low. If a synchronization error occurs, the software unit concerned must be subjected to re-engineering in order to rectify the error.

The respective software unit is implemented using software technology. The respective software unit can be configured as a computer program, a function, a routine, part of a program code, as a module or part of a module, or as an executable object.

Furthermore, a computer program is proposed which initiates the execution, on a program-controlled device, of a method as described above for testing a system having at least a plurality of software units that can be executed simultaneously.

A computer program product such as a computer program means can be provided or delivered as, for example, a storage medium such as a memory card, USB stick, floppy disk, CD-ROM, DVD or in the form of a file downloaded from a server in a network. This can take place, for example, in a wireless communications network through the transmission of a suitable file with the computer program product or the computer program means.

Furthermore, a device is proposed for testing a system, having at least a plurality of software units that can be executed simultaneously and which are configured for executing a thread and for providing a common result and which have a respective programmed operating time period for the execution. The device has a changing means for changing a predetermined operating time period of at least one software unit into a settable operating time period and a test means for testing the system, the test means being configured for varying the at least one settable operating time period for detecting synchronization errors in the system.

The respective means, changing means and test means can be implemented with hardware or software. With a hardware implementation, the respective means can be configured as a device, for example, as a computer, microprocessor, apparatus or as part of a system, for example, a computer system. In a software implementation, the respective means can be configured as a computer program product, a function, a routine, part of a program code or as an executable object.

A current trend in science and industry lies in the virtualization of resources and services. A subsection thereof is the virtualization of hosts and operating systems. In this context, a plurality of "virtual machines" is realized on an end system. These virtual machines present themselves to the user as self-contained systems. For this purpose, hardware units and software units are simulated and thus virtually replicated. In existing virtualization solutions, the virtual hardware units or hardware components are simulated such that the normal or correct functionality of the real hardware pendant is exactly emulated.

According to the some embodiments, this aim with respect to virtualization is counteracted in the sense that the stepless and selective slowness and delay as a performance or output minimization of the respective software unit now becomes a central property. This is explicitly introduced into the test means or the hypervisor. Accordingly, the software units are enhanced or extended such that the performance thereof can be adjusted individually and dynamically by the test means, for example, the test framework. Thus, empirical experiments on the software tests are possible. By this means, synchronization errors in a system including a plurality of asynchronously operating software units can be economically identified.

To summarize, the essential advantage of certain embodiments lies therein that dedicated software units or software modules can be changed in the operating time period thereof. In particular, the performance of the hardware units can be adjusted. However, it is precisely this that can lead to synchronization errors on a different hardware configuration of the target system.

According to certain embodiments, test cover that is better and, above all, closer to reality, can be assured. According to certain embodiments, for analysis of the synchronization behavior, not only the sequence can be changed, but the running behavior as a whole, that is, the performance properties of the modules or hardware components can be altered. It is therefore not only the chronological behavior, but also the order that can be changed.

Consequently, serialization is not necessary, thus permitting, in particular, testing on truly parallel platforms and therefore better reflecting the hardware conditions on the actual target systems. Furthermore, due to the high degree of hardware heterogeneity, improved test case cover is ensured. Thus, synchronization errors arise, resulting from different performance properties of the hardware and these errors cannot be covered, for example, through the dynamic analysis as described.

In some embodiments, an analyst, tester or software engineer obtains valuable information on possible synchronization errors.

Overall, it is also possible in certain embodiments to test situations which conventionally have been precluded from testing. This may result, inter alia, in the advantages that improved test case coverage and time-saving can be achieved during testing. In particular, through the virtualization of the environment, certain embodiments enable automation of testing and the testing of widely varying systems. This may result in substantial time and cost savings as well as a high degree of security and reduction of faults in the tested product.

The approach taken in certain embodiments may have the advantage over the approaches of special programming languages (see [2] and [3]) of being implemented in any programming languages, although the aforementioned special programming languages are not generally accepted (see [7]).

In accordance with an approach (see [11]) known as "model checking", according to certain embodiments, no formal model or formula must be specified. Furthermore, only small systems can be verified using model checking. Such embodiments, however, may be intended for the software industry and may therefore be better suited to relatively large projects. Although with model checking, synchronization errors can be discovered, the system to be tested must exist as a formula or system description which, in the industrial environment is relatively seldom the case. Also, the state space normally grows disproportionately with the size of the system to be tested. Thus only relatively small systems or programs can be verified with model checking. The reasons for this lie particularly in the storage space required and a disproportionately long time requirement.

The advantages of certain embodiments will now be described in greater detail by comparison with static analysis methods. Conventionally, there exists a class of programming tools, for example, the tools "FindBug" [1] and "RacerX" [5] which search for static patterns in the software code. Apart from the error-proneness of "false positives", that is, due to identified errors which are actually not errors, the approach of static analysis continues to have the following disadvantages:

The code or software code must be present in toto. However, the development of relatively large projects is based on the re-use of existing code components, such as libraries which often come from third party providers. These third party providers are usually not prepared to disclose their software code and their libraries. Furthermore, in the context of a static analysis, conflicts in connection with routines of the operating system cannot be analyzed. In addition, using static analysis, the respective current behavior on a real or potentially possible system cannot be investigated. Therefore, unnecessary synchronization mechanisms may be present in the software code which can actually needlessly slow the system down or synchronization problems can arise due to the hardware used. Furthermore, large software products are conventionally often implemented in different programming languages, making a static analysis significantly more difficult.

According to certain embodiments, a significant time saving in comparison with such static analysis methods can be achieved. Nor is it necessary, according to certain embodiments, for the entire code or software code to be completely present. There is also no requirement for said code to be present in a single programming language because testing is carried out empirically, according to certain embodiments. A further advantage lies therein that no "false positives" are found.

The advantages of certain embodiments compared with a dynamic analysis by performing potentially possible thread interleaving will now be described.

An example of a dynamic analysis by performing potentially possible thread interleaving is known from the tool "Chess" [9]. Chess reduces the possible preemptions to prevent an explosion of the state space of possible thread interleavings [9; page 9]. However, there is a probability that specifically due to said preemptions, synchronization errors and race conditions could disadvantageously arise.

"Chess" reorders possible execution combinations and forces "single-threaded" execution [9; page 7]. In this cited passage, it is also mentioned that no complete coverage of data races is possible, which can lead to some undiscovered errors. A further problem with the Chess tool lies in true hardware parallelism. It is probable that, given true hardware parallelism in contrast to a pseudoparallelism, errors arise that cannot be found through the permutation of possible execution sequences.

The advantages of certain embodiments compared with a dynamic analysis of data races will now be discussed. From the publication [14], the tool "Race Track" is known, by means of which data races can be found. In this case, a virtual machine is set up. The actions of the program are recorded and potential data races are reported. Indeed, in [14; page 1], reference is made to the fact that by means of the dynamic approach, only a part of all possible data races can be found, since not all the possible execution paths are observed. On other target systems with other (hardware) properties, this can be decisive since the execution paths can differ due to the altered hardware properties. The approach disclosed herein covers said altered hardware properties by a significantly greater quantity of execution paths, since the run-time properties of the individual modules are varied.

According to an example embodiment, predetermined operating time properties of the execution of the respective software unit are configured by the programmed operating time period of the execution of the respective software unit, by means of a starting time point for the execution and a finish time point for the execution.

According to a further embodiment, the programmed operating time period of at least one software unit is changed to a settable operating time period.

According to a further embodiment, the predetermined starting time point of at least one software unit is changed to a settable starting time point.

According to a further embodiment, the predetermined end time point of at least one software unit is changed to a settable end time point.

Thus, starting and end time points and the operating time period can advantageously be artificially varied in order to reproduce and therefore identify synchronization errors after a relatively short time.

According to a further embodiment, the testing of the system involves varying the at least one settable operating time period and varying the at least one settable starting time point and/or varying the at least one settable end time point.

For example, the execution time point of the software units is temporally delayed. This corresponds, for example, to the case where a software unit is not executable at the predefined time point. This is designated "retardation".

The execution time period of the software unit can also be prolonged. This corresponds, for example, to the case where a software unit takes longer for processing a predetermined task. This is designated "prolongation".

According to a further embodiment, the changing of at least one of the operating time properties of the execution of the respective software unit to provide at least one settable operating time property is configured by changing a code of the respective software unit.

According to a further embodiment, the changing of at least one of the operating time properties of the execution of the respective software unit to provide at least one settable operating time property is configured by:

providing a number of hardware units which are set up to process the software units;

simulating the respective hardware unit to provide a respective simulated hardware unit; and extending the respective simulated hardware unit such that at least one of the operating time properties of the simulated hardware unit, by means of which the respective software means is processed at the execution time point of the software means, is adjustable.

The respective simulated, particularly virtualized or emulated hardware unit is implemented with software. The respective simulated hardware unit can be configured as a computer program product, as part of a program code, as a module or as part of a module or as an executable object.

Advantageously, the simulated hardware units, for example, virtualized hardware components are enhanced or extended such that the performance thereof can be adjusted individually and dynamically by the test means, in order to detect insufficient synchronization of the system.

In order to control the performance properties, according to certain embodiments, the test means is extended with interfaces which are accessible from the test framework. Thus, for a test framework, the performance of the software units and of the simulated hardware units can be finely adjusted, for example, down to the micro-command level, and dynamically.

According to certain embodiments, this fundamentally extends the test methodology for a system. Software is susceptible to race conditions and synchronization errors. Conventionally, such errors can only be discovered accidentally in a conventional testing process.

Certain embodiments may therefore reduce the danger that such errors will not be found, particularly if the target systems differ from the test and development systems. In particular, a different configuration can be used on the target system than on the test and development system.

According to a further embodiment, the simulation of the respective hardware unit is configured as a virtualization or an emulation.

According to a further embodiment, the testing of the system is carried out to provide test result data, wherein a predetermined number of synchronization measures which are predetermined and to be investigated, said measures being used for synchronization of the software units, is suppressed during testing and the testing is carried out to the end with the synchronization measures suppressed, and the test result data provided are validated to detect unnecessary synchronization measures.

Synchronization is preferably used as a safety mechanism, but can also slow a system down. Synchronization blocks an object so that other parallel executions are not able to access this object. The overhead of synchronization has been significantly improved by recent research (e.g. [6]), although too much synchronization is sometimes used during programming and this can slow a system down.

In the present case, during execution of the system in a dedicated manner, at least one synchronization measure to be investigated is suppressed in order to detect race conditions, in particular, since only the potential possible race conditions require synchronization.

According to a further embodiment, given a positive validation of the test results supplied, the synchronization measures investigated with the testing are identified as being unnecessary synchronization measures.

According to a further embodiment, variation of the at least one settable operating time period is configured as a prolongation of the operating time period by a predetermined duration.

For further tests, it is advantageously useful to prolong a combination of software units. The prolongation is carried out by the test means according to certain embodiments. The test means may comprise, in particular, a specially constructed virtual machine in order thereby to facilitate the work of the developer or tester and to automate the test.

For example, by means of the test means, for every software unit, the developer can specify a vector which defines by what time duration or by what percentage the totality of the execution of the respective software unit is to be prolonged or retarded. This results, for a particular test case, in a vector of vectors which describes the behavior of the software units.

Furthermore, an extension for simulated optimization is proposed, in order additionally to enable shortening of the execution period by means of the prolongation.

According to a further embodiment, a plurality of predetermined operating time periods of a plurality of software units is changed to provide respectively settable operating time periods.

Thus, in the plurality of asynchronously running software units, synchronization errors can advantageously be discovered.

According to a further embodiment, the testing comprises varying the plurality of settable operating time periods of the plurality of software units.

The invention will now be described in greater detail with reference to the figures.

FIG. 1 shows a schematic flow diagram of a first example embodiment of a method for testing a system comprising a plurality of software units that can be executed simultaneously.

The software units that can be executed simultaneously are configured for respective execution of a thread and for provision of a common result. The respective software unit has a respective programmed or coded operating time period for execution. The respective software unit also comprises, for example, a program and data.

FIG. 1 may include the following method steps 101 to 103:

Method Step 101:
The programmed operating time period of at least one software unit is changed to a settable operating time period.

Method Step 102:
A test means 3 (see FIG. 3) for validating the system and for setting the at least one settable operating time period is provided.

Method Step 103:
The system is tested by means of the test means to provide test results. The testing comprises varying the at least one settable operating time period for detecting synchronization errors of the system.

Preferably, the variation of the at least one settable operating time period is configured as a prolongation of the operating time period by a predetermined duration. Furthermore, the variation can also be configured as a shortening of the operating time period by a predetermined or predeterminable duration.

Figure 2:
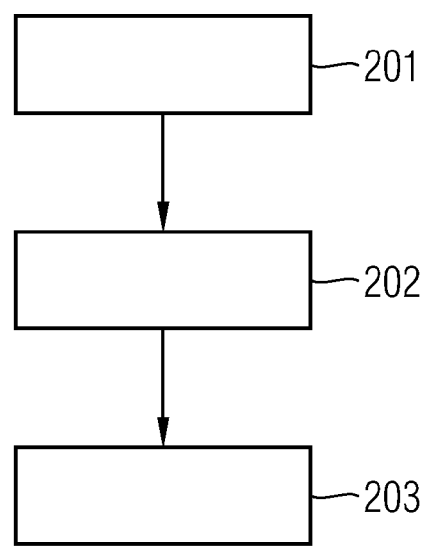
FIG. 2 shows a schematic flow diagram of a second example embodiment of a method for testing a system comprising a plurality of software units that can be executed simultaneously.

FIG. 2 shows a schematic flow diagram of a second example embodiment of a method for testing a system comprising a plurality of software units that can be executed simultaneously and for respective execution of a thread and for providing a common result and respectively having a programmable operating time period of the execution.

FIG. 2 may include the method steps 201-203.

Method Step 201:
Various programmed operating time properties of the execution of the respective software unit are changed. The predetermined or programmed operating time properties are configured by the predetermined operating time period of the execution of the respective software unit, by a starting time point of the execution and by an end time point of the execution.

The predetermined operating time period of at least one software unit is changed to an adjustable operating time unit. Additionally, the predetermined starting time point of at least one software unit is preferably changed to an adjustable starting time point. Additionally or alternatively, the predetermined end time point of at least one software unit is changed to an adjustable end time point.

The changing of at least one of the operating time properties of the execution of the respective software unit is configured, for example, by the changing of a code of the respective software unit.

Alternatively or additionally, the changing of at least one of the operating time properties of the execution of the respective software unit can be configured to provide at least one adjustable operating time property through the following partial steps: a number of hardware units is provided which is configured for executing the software units. Each hardware unit is simulated in order to provide a respective simulated hardware unit. The simulation can be a virtualization or an emulation. Furthermore, the respective simulated hardware unit is extended such that at least one of the operating time properties of the simulated hardware unit by means of which the respective software means is executed at the execution time point of the software means is adjustable. The respective hardware unit is configured, for example, as a computer, microprocessor, facility or as part of a computer system.

Method Step 202:

A test means 3 (see FIG. 3) is provided for validating the system and for adjusting the adjustable operating time properties.

Method Step 203:

The system is tested to provide test results. A predeterminable number of predetermined synchronization measures for synchronization of the software units and are to be investigated are suppressed during testing. The testing is carried out to the end with the suppressed synchronization measure, the test result data provided being validated to detect unnecessary synchronization measures.

Figure 3:
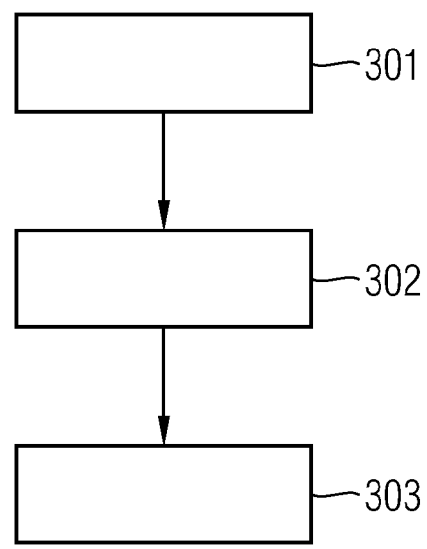
FIG. 3 shows a schematic flow diagram of a third example embodiment of a method for testing a system comprising a plurality of software units that can be executed simultaneously.

FIG. 3 shows a schematic flow diagram of a third example embodiment of a method for testing a system comprising a plurality of software units that can be executed simultaneously.

The third example embodiment is based on the first example embodiment of FIG. 1 and may include all the features described in relation to FIG. 1. The third example embodiment of FIG. 3 may include the method steps 301 to 303:

Method Step 301:

A plurality of programmed or predetermined operating time periods of a plurality of software units is changed to provide respectively settable operating time periods.

Method Step 302:

A test means 3 (see FIG. 3) is provided in order to validate the system and to set the at least one settable operating time period.

Method Step 303:

The testing of the system is carried out by means of the test means, wherein the testing involves varying the plurality of settable operating time periods of the plurality of software units for detecting synchronization errors of the system.

Figure 4:
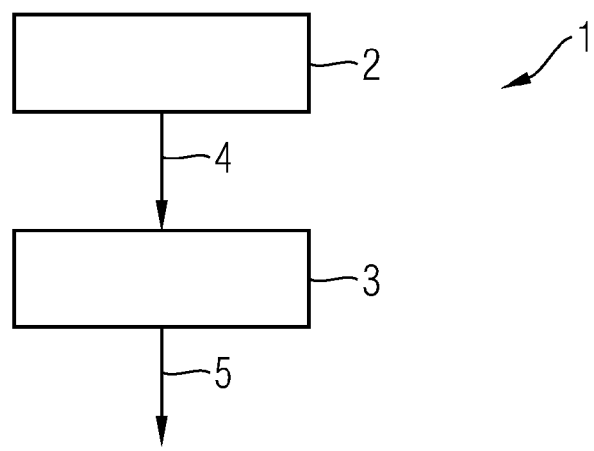
FIG. 4 shows a schematic block circuit diagram of an example embodiment of a device for testing a system comprising a plurality of software units that can be executed simultaneously.

FIG. 4 shows a schematic block circuit diagram of an example embodiment of a device 1 for testing a system comprising a plurality of software units that can be executed simultaneously. The simultaneously executable software units are set up for executing a thread and for providing a common result and have respective programmed operating time periods of the execution.

The device has at least one changing means 2 and one test means 3.

The changing means 2 is configured in order to change a programmed or predetermined operating time period of at least one software unit into a settable operating time period. The changing means 2 therefore provides, on the output side, at least one changed software unit 4.

The test means 3 is configured to test the system for providing test result data 5. The testing is configured in order to vary the at least one settable operating time period of the at least one changed software unit 4 for detecting synchronization errors of the system.

Although the present invention has been described above on the basis of example embodiments, it is not limited thereto, but can be modified in a wide variety of ways.

LITERATURE REFERENCES

[1] Ayewah, Nathaniel; Hovemeyer, David; Morgenthaler, J. D.; Penix, John; Pugh, William: Using Static Analysis to Find Bugs. In: IEEE Software 25 (2008), No. 5, pp. 22-29. http://dx.doi.org/http://doi.ieeecomputersociety.org/10.1109/MS.2008.130.-DOIhttp://doi.ieeecomputersociety.org/10.1109/MS.2008.130.—ISSN 0740-7459

[2] Bacon, David F.; Strom, Robert E.; Tarafdar, Ashis: Guava: A dialect of Java without data races. In: In Object-Oriented Programming, Systems, Languages, and Applications (OOPSLA, ACM Press, 2000, pp. 382-400)

[3] Boyapati, Chandrasekhar; Lee, Robert; Rinard, Martin: Ownership types for safe programming: preventing data races and deadlocks. In: OOPSLA '02: Proceedings of the 17th ACM SIGPLAN Conference on object-oriented programming, systems, languages, and applications, vol. 37. New York, N.Y., USA: ACM Press, November 2002. —ISBN 1581134711, 211-230

[4] Choi, Jong-Dek; Lee, Keunwoo; Loginov, Alexey; O'Callahan, Robert; Sarkar, Vivek; Sridharan, Manu: Efficient and precise datarace detection for multithreaded object-oriented programs. In: PLDI '02: Proceedings of the ACM SIGPLAN 2002 Conference on Programming language design an implementation. New York, N.Y., USA: ACM, 2002.—ISBN 1-58113-463-0, pp. 258-269

[5] Engler, Dawson; Ashcraft, Ken: RacerX: effective, static detection of race conditions and deadlocks. In: SIGOPS Oper. Syst. Rev. 37 (2003), No. 5, pp. 237-252. http://dx.doi.org/http://doi.acm.org/10.1145/1165389.945468.—DOI http://doi.acm.org/10.1145/1165389.945468.—ISSN 0163-5980

[6] Hohmuth, Michael; Hartig, Hermann: Pragmatic Non-blocking Synchronization for Real-Time Systems. In: Proceedings of the General Track: 2002 USENIX Annual Technical Conference. Berkeley, Calif., USA: USENIX Association, 2001.—ISBN 1-880446-09-X, pp. 217-230.

[7] Hovemeyer, David; Pugh, William: Finding concurrency bugs in Java. In: In Proceedings of the PODC Workshop on Concurrency and Synchronization in Java Programs, 2004.

[8] Florian Mangold. Performanzanalyse mit Hilfe künstlicher Varianz. [Performance Analysis with the Aid of Artificial Variance], Master's degree dissertation, Ludwig-Maximilian University, Munich, May 2007.

[9] Musuvathi, Madanlal; Qadeer, Shaz; Ball, Thomas; Basler, Gerard; Ninar, Piramanayagam A.; Naemtiu, Iulian: Finding and Reproducing Heisenbugs in Concurrent Programs. In: Draves, Richard (ed.); Renesse, Robbert van (ed.): OSDI, USENIX Association, 2008.—ISBN 978-1-931971-65-2, 267-280

[10] Netzer, Robert H. B.; Miller, Barton P.: What are race conditions? Some issues and formalizations. In: ACM Letters on Programming Languages and Systems 1 (1992), pp. 74-88.

[11] Stoller, Scott D.: Testing Concurrent Java Programs using Randomized Scheduling. In: Proc. Second Workshop on Runtime Verification (RV), vol. 70(4), Elsevier, July 2002 (Electronic Notes in Theoretical Computer Science)

[12] Yourdon Edward, Larry L. C: Structured Design: Fundamentals of a Discipline of Computer Program and Systems Design. Englewood Cliffs, N.J.: Prentice Hall, 1979

[13] Laarhoven, P. J. M., Aarts, E. H. L. "Simulated Annealing: Theory and Applications", Norwell, Mass., USA, Kluwer Academic Publishers, 1987

[14] Yu, Yuan; Rodeheffer, Tom; Chen, Wei: Race Track: Efficient Detection of Data Race Conditions via Adaptive Tracking. In: SOSP '05: Proceedings of the twentieth ACM Symposium on Operating Systems Principles. New York, N.Y., USA; ACM Press, 2005, 221-234

What is claimed is:

1. A method for testing a software system having a plurality of software units that can be executed simultaneously and are configured respectively for execution of a thread and for providing a common result and respectively having a programmable operating time period of the execution, the method comprising:
 a) changing a pre-set operating time period of at least one software unit to a settable operating time period;
 b) using a testing system to validate the software system and to set the at least one settable operating time period; and
 c) using the testing system to test the software system, wherein the testing includes varying the at least one settable operating time period for detecting synchronization errors of the software system.

2. The method as claimed in claim 1, wherein programmed operating time properties of the execution of the respective software unit are configured by a programmed operating time period of the execution of a respective software unit, by means of a starting time point for the execution and by means of an end time point for the execution.

3. The method of claim 2, wherein the programmed operating time period of at least one software unit is changed to a settable operating time period and wherein at least one of (a) the predetermined starting time point of at least one software unit is changed to a settable starting time point and (b) the predetermined end time point of at least one software unit is changed to a settable end time point.

4. The method of claim 3, wherein the testing of the software system involves varying the at least one settable operating time period and varying at least one of (a) the at least one settable starting time point and (b) the at least one settable end time point.

5. The method of claim 2, wherein changing of at least one of the operating time properties of the execution of the respective software unit to provide at least one settable operating time property is configured by changing a code of the respective software unit.

6. The method of claim 2, wherein changing of at least one of the operating time properties of the execution of the respective software unit to provide at least one settable operating time property is configured by:
 providing a number of hardware units which are set up to process the software units; and
 for each hardware unit:
  simulating the hardware unit to provide a respective simulated hardware unit; and
  extending the simulated hardware unit such that at least one of the operating time properties of the simulated hardware unit, by means of which the respective software means is processed at the execution time point of the software means, is adjustable.

7. The method of claim 6, wherein the simulation of the respective hardware unit is configured as a virtualization or an emulation.

8. The method of claim 1, wherein the testing of the software system is carried out to provide test result data, wherein a predeterminable number of synchronization measures used for synchronization of the software units are suppressed during testing and the testing is carried out to the end with the synchronization measures suppressed, wherein the test result data provided are validated to detect unnecessary synchronization measures.

9. The method of claim 8, wherein the synchronization measures investigated by the testing are identified, in the event of a positive validation of the test results provided, as being unnecessary synchronization measures.

10. The method of claim 1, wherein variation of the at least one settable operating time period is configured as prolongation of the operating time period by a predetermined duration.

11. The method of claim 1, wherein a plurality of predetermined operating time periods of a plurality of software units is changed to provide respectively settable operating time periods.

12. The method of claim 11, wherein the testing comprises varying the plurality of settable operating time periods of the plurality of software units.

13. A computer program product for testing a software system having a plurality of software units that can be executed simultaneously and are configured respectively for execution of a thread and for providing a common result and respectively having a programmable operating time period of the execution, the computer program product being embodied in non-transitory computer-readable media and executable by a processor to:
 change a pre-set operating time period of at least one software unit to a settable operating time period;
 operate a testing system to validate the software system and to set the at least one settable operating time period; and
 operate the testing system to test the software system, wherein the testing includes varying the at least one settable operating time period for detecting synchronization errors of the software system.

14. A device for testing a software system having at least a plurality of software units that can be executed simultaneously and are configured for execution of a thread and for providing a common result and respectively having a programmable operating time period of the execution, the device comprising:
 a processor; and
 computer instructions stored in non-transitory computer-readable media and executable by the processor to:
  change a pre-set operating time period of at least one software unit to a settable operating time period; and
  test the software system, wherein the testing includes varying the at least one settable operating time period in order to detect synchronization errors of the software system.

* * * * *